United States Patent
Swan et al.

(10) Patent No.: US 12,441,855 B2
(45) Date of Patent: Oct. 14, 2025

(54) ACRYLIC COMPOSITES WITH IMPROVED SURFACE PROPERTIES

(71) Applicant: Arkema France, Colombes (FR)

(72) Inventors: Dana L. Swan, Spring City, PA (US); Robert A. Wanat, Langhorne, PA (US); Robert J. Barsotti, Newtown Square, PA (US); Nathan J. Bachman, West Chester, PA (US); Pierre Gerard, Denguin (FR)

(73) Assignee: Arkema France, Puteaux (FR)

( * ) Notice: Subject to any disclaimer, the term of this patent is extended or adjusted under 35 U.S.C. 154(b) by 675 days.

(21) Appl. No.: 17/294,763

(22) PCT Filed: Nov. 19, 2019

(86) PCT No.: PCT/US2019/062102
§ 371 (c)(1),
(2) Date: May 18, 2021

(87) PCT Pub. No.: WO2020/106663
PCT Pub. Date: May 28, 2020

(65) Prior Publication Data
US 2021/0403653 A1    Dec. 30, 2021

Related U.S. Application Data

(60) Provisional application No. 62/769,027, filed on Nov. 19, 2018.

(51) Int. Cl.
*C08J 5/04* (2006.01)
*C08J 3/205* (2006.01)
(Continued)

(52) U.S. Cl.
CPC ............. *C08J 5/043* (2013.01); *C08J 3/2053* (2013.01); *C08J 3/212* (2013.01); *C08K 3/013* (2018.01);
(Continued)

(58) Field of Classification Search
CPC ......... C08L 55/02; C08L 33/12; C08K 3/013; C08K 5/0041; C08K 5/005; C08K 7/14; C08K 5/3475
See application file for complete search history.

(56) References Cited

U.S. PATENT DOCUMENTS 5,750,234 A    5/1998  Johnson et al.
8,101,705 B2   1/2012  Crawford et al.
(Continued)

OTHER PUBLICATIONS

Hawley's Condensed Chemical Dictionary by Larranaga et al. (Year: 2016).*

*Primary Examiner* — Mark S Kaucher
(74) *Attorney, Agent, or Firm* — Buchanan Ingersoll & Rooney PC

(57) ABSTRACT

The present invention relates to a composite material obtained by in situ polymerization of a thermoplastic resin with additives with a fibrous material. More particularly the present invention relates to a polymeric composite material obtained by in-situ polymerization of a thermoplastic (meth) acrylic resin and a fibrous material utilizing additive technologies to improve properties such as surface properties, and its use, and processes for making such a composite material and manufactured mechanical or structured part or article comprising this polymeric composite material.

16 Claims, 1 Drawing Sheet

(51) Int. Cl.
*C08J 3/21* (2006.01)
*C08K 3/013* (2018.01)

(52) U.S. Cl.
CPC ........ *C08J 2327/16* (2013.01); *C08J 2333/12* (2013.01)

(56) References Cited

U.S. PATENT DOCUMENTS

| | | |
|---|---|---|
| 9,777,140 B2 | 10/2017 | Gerard et al. |
| 9,920,148 B2 | 3/2018 | Murakami |
| 2010/0228001 A1 | 9/2010 | Mortimer |
| 2014/0256850 A1* | 9/2014 | Gerard .................... C08J 5/247 523/222 |
| 2015/0299360 A1* | 10/2015 | Murakami .............. F21S 43/26 525/205 |
| 2015/0352818 A1* | 12/2015 | Glotin .................... B29C 70/06 156/245 |
| 2016/0025906 A1 | 1/2016 | Liu et al. |

* cited by examiner

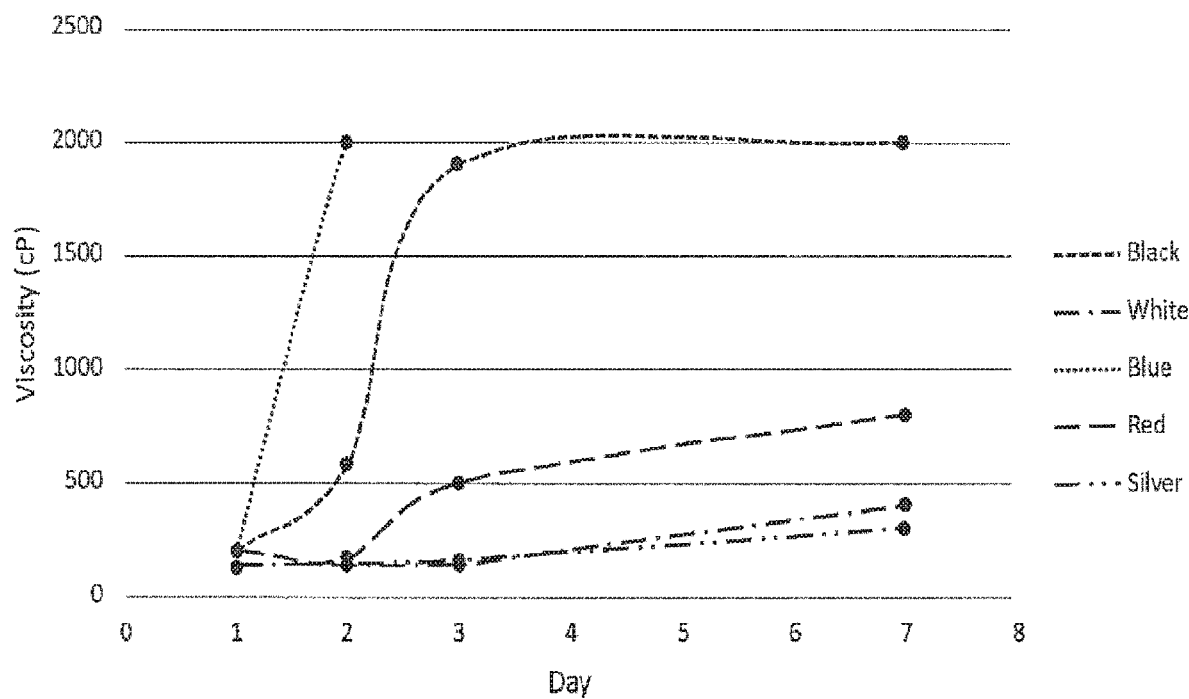

ACRYLIC COMPOSITES WITH IMPROVED SURFACE PROPERTIES

This application claims benefit, under U.S.C. § 119 or § 365 of PCT Application Number PCT/US2019/062102, filed Nov. 19, 2019; and U.S. Provisional Application No. 62/769,027, filed Nov. 19, 2018; said applications incorporated herein by reference.

FIELD OF THE INVENTION

The present invention relates to a composite material obtained by in situ polymerization of a thermoplastic resin with additives with a fibrous material. More particularly the present invention relates to a polymeric composite material obtained by in-situ polymerization of a thermoplastic (meth) acrylic resin and a fibrous material utilizing additive technologies to improve properties such as surface properties, and its use, and processes for making such a composite material and manufactured mechanical or structured part or article comprising this polymeric composite material.

BACKGROUND OF THE INVENTION

A composite material is a macroscopic combination of two ore more non miscible materials. The composite material constitutes at least of a matrix material that forms a continuous phase for the cohesion of the structure and a reinforcing material with various architectures for the mechanical properties.

The aim in using composite materials is to achieve a performance from the composite material that is not available from its separate constituents if used alone. Consequently, composite materials are widely used in several industrial sectors, 5 as for example building, automotive, aerospace, transport, leisure, electronics, and sport notably due to their better mechanical performance (higher tensile strength, higher tensile modulus, higher fracture toughness) in comparison with homogenous materials and their low density.

The most important sector in view of volume in commercial industrial scale, are composites with organic matrices, where the matrix material is a generally polymer. The principal matrix or continuous phase of a polymeric composite material is either a thermoplastic polymer or a thermosetting polymer.

Thermosetting polymers consist of crosslinked three dimensional structures. The crosslinking is obtained by curing reactive groups inside the so called prepolymer. Curing for example can be obtained by heating the polymer chains in order to crosslink and harden the material permanently. In order to prepare the polymeric composite material the prepolymer is mixed with the other component (for example glass beads for a particulate composite or short fibers for a fibrous composite) or the other component is wetted or impregnated (for example woven nets) and cured afterwards. Example for prepolymers or matrix material for thermoset polymers are unsaturated polyesters, vinylesters, epoxy or phenolic ones.

The disadvantage of a thermoset polymer matrix is its rigidity. The matrix cannot be easily shaped in other forms. Once the polymer has been cured the form is fixed. This also makes the recycling of the thermoset composite material difficult, and scrap is generally burned in a cement plant or thrown into a waste dump. A further disadvantage of many thermoset resins is their poor resistance to ultraviolet (UV) radiation-limiting their lifetime in outdoor environments due to losses in mechanical or aesthetic properties after prolonged exposure to sunlight.

Thermoplastic polymers consist of linear or branched polymers, that are not crosslinked. The thermoplastic polymers are heated in order to mix the two constituents necessary for producing the composite material and to be cooled for setting. The limit in using thermoplastic polymers for the fabrication of composite materials is their high viscosity in the molten state. The wetting or correct impregnation of the fibers by the thermoplastic polymer can only be achieved, if the thermoplastic resin is sufficiently fluid. In order to have a low viscosity or sufficient fluidity of the thermoplastic polymer the chain length (molecular mass) can be reduced. However a too low molecular weight has a negative impact on the performance of the composite material especially the mechanical properties. On the other hand the temperature of the thermoplastic polymer could be increased in order to reduce the viscosity in an important way. Consequently the continuous working temperature is relatively high, above 200° C., influencing directly the economics (costs) of the composite material due to implication of high energy costs. Additionally thermoplastic polymers tend to degrade if the temperature is very high, which is especially true for semicrystalline thermoplastic polymers that have high melting points as for example polyamides (for example PA6.6), polyethersulfon (PES), polyetherimid (PEI), polyetheretherketon (PEEK) or polyphenylene sulfide (PPS). This thermo induced degradation yields to a decreasing molecular weight of the polymer matrix important for the cohesion of the composite material.

Another way for impregnating the fibrous substrate is to dissolve the thermoplastic polymer in an organic solvent. However this method requires a lot of solvent that has to be evaporated. There are environmental issues in using large quantities of solvent in term of energy and pollution.

U.S. Pat. No. 9,777,140 describes a composites material formed by in-situ polymerization of (meth)acrylic monomers to form a thermoplastic composite. The resulting acrylic matrix allows for superior UV resistance to most thermoset materials but due to additives and initiators used in the polymerization, overall resistance to UV is still inferior to many pure thermoplastic materials. In addition, the material can lack in properties such as chemical or flame resistance or aesthetic properties such as gloss or richness of color.

WO2014/111129 describes a method of improving surface characteristics of an acrylic composite but utilizes a multilayer material to achieve the desired properties. The use of multilayer material may not be desirable due to increases in production steps-leading to additional cost and time.

The objective of the present invention is to have a thermoplastic polymeric composite material with excellent surface properties that can be prepared easily, be transformed and shaped into form, where the polymeric matrix has a high molecular weight.

Another objective of the present invention is to have processes to form the composite materials with excellent surface properties and to do so in an economical fashion when possible.

It has surprisingly been found that a thermoplastic composite materials with excellent surface properties can be formed from a thermoplastic (meth)acrylic matrix, a fibrous material and the use of polymeric, small molecule and/or inorganic additives.

SUMMARY OF THE INVENTION

The invention comprises a composite material with a thermoplastic (meth)acrylic matrix, a fibrous material as reinforcement and a polymeric, small molecule (where small molecule is defined as an organic molecule having a molecular weight (Mw) of <10,000 Daltons and polymeric additive is defined as having a molecular weight >10,000 Daltons) or inorganic additive. Specifically, the invention comprises a material that utilizes additives such as UV absorbers, non-acrylic polymeric additives, dyes, pigments or other colorants, and inorganic additives where the additive is homogeneously distributed throughout the matrix. The invention also comprises a material that uses any polymeric, small molecule or inorganic additive, where the additives is distributed non-homogeneously throughout the matrix.

The invention further comprises a process to form the composite material whereby the polymeric, small molecule or inorganic additive is dispersed or dissolved in a liquid syrup comprising the monomers to form the thermoplastic (meth)acrylic matrix. The liquid syrup is brought into contact with the fibrous material through a wetting step, followed by polymerization of the monomers. In this process, the additive will be dispersed homogenously throughout the composite.

The invention further comprises a process to form the composite material by introducing material comprising the polymeric, small molecule or inorganic additive directly onto the fibrous support. The liquid syrup, which comprises monomers to form the thermoplastic (meth)acrylic matrix, is again brought into contact with the fibrous material through a wetting step, followed by polymerization of the monomers. This process has the advantages of being able to apply the additive only in areas where it is needed. For example, surface properties of the composites could be altered by introducing the additive only on the outermost 1 to 10 plies of the composite. This could be advantageous for example to improve the surface hardness of the material without effecting the impact of the bulk composite.

The invention further comprises mechanical or structural parts comprising such a polymeric composite material which may consist of one or multiple layers.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:

A composite material comprising
(a) a polymeric thermoplastic (meth)acrylic matrix and
(b) a fibrous material as reinforcement and
(c) 0.005% to 5% of one or more additives that improves the UV or thermal stability of the composite material, where the fibrous material has either at least an aspect ratio of the fibre of at least 1000 or at least a two dimensional macroscopic structure, has satisfying mechanical and surface properties.

A composite material comprising
(a) a polymeric thermoplastic (meth)acrylic matrix and
(b) a fibrous material as reinforcement and
(c) 0.5-50% of a non-acrylic polymer additive
wherein the fibrous material has either at least an aspect ratio of the fibre of at least 1000 or at least a two dimensional macroscopic structure, has satisfying mechanical and surface properties.

A composite material comprising
(a) a polymeric thermoplastic (meth)acrylic matrix and
(b) a fibrous material as reinforcement and
(c) 0.1-10% of an additive that imparts color to the composite such as a dye or pigment, where the fibrous material has either at least an aspect ratio of the fibre of at least 1000 or at least a two dimensional macroscopic structure, has satisfying mechanical and surface properties.

A composite material comprising
(a) a polymeric thermoplastic (meth)acrylic matrix and
(b) a fibrous material as reinforcement and
(c) 0.1-50% of an inorganic additive that alters the light diffusion, reflection or absorption, surface hardness, bulk density or electronic conductivity of the composite. where the fibrous material has either at least an aspect ratio of the fibre of at least 1000 or at least a two dimensional macroscopic structure, has satisfying mechanical and surface properties.

A composite material comprising
(a) a polymeric thermoplastic (meth)acrylic matrix and
(b) a fibrous material as reinforcement and
(c) 0.005% to 50% of one or more polymeric, small molecule or inorganic additives
where a non-homogeneous distribution of one or more of the additives is realized in the composite, where at least 1% by volume of the composite contains at least 1% by weight more or 1% by weight less of one of the additives as compared to the concentration of the same additive by weight in the remainder of the composite.

A process to form the composite material of the invention whereby the polymeric, small molecule or inorganic additive is dispersed or dissolved in a liquid syrup comprising the monomers to form the thermoplastic (meth)acrylic matrix. The fibrous material and the liquid syrup are brought into contact by a wetting step followed by polymerization of the monomers for forming the polymeric thermoplastic (meth)acrylic matrix.

A process to form the composite material of the invention whereby the polymeric, small molecule or inorganic additive is introduced directly onto the fibrous material. The fibrous material and the liquid syrup, which comprises the monomers to form the thermoplastic (meth)acrylic matrix, are brought into contact by a wetting step followed by polymerization of the monomers for forming the polymeric thermoplastic (meth)acrylic matrix.

A manufactured mechanical or structured part or article comprising such a polymeric composite material.

BRIEF DESCRIPTION OF THE DRAWINGS

FIG. 1 shows a graph summarizing viscosity over time of tested samples.

DETAILED DESCRIPTION OF THE INVENTION

The invention comprises a composite material with a thermoplastic (meth)acrylic matrix, a fibrous material as reinforcement and a polymeric, small molecule or inorganic additive.

All molecular weights are weight average molecular weights determined by gel permeation chromatography unless stated otherwise. All references listed are incorporated herein by reference. All compositions are given in terms of weight percentage (%) unless stated otherwise.

By the term "(meth)acrylic" as used herein is denoted all kind of acrylic and methacrylic monomers.

By the term "PMMA" as used herein are denoted homo- and copolymers of methylmethacrylate (MMA), for the copolymer of MMA the weight ratio of MMA inside the PMMA is at least 50 wt %.

By the term "thermoplastic polymer" as used herein is denoted a polymer that turns to a liquid or becomes more liquid or less viscous when heated and that can take on new shapes by the application of heat and pressure.

By the term "thermosetting polymer" as used herein is denoted a prepolymer in a soft, solid or viscous state that changes irreversibly into an infusible, insoluble polymer network by curing.

By the term "polymer composite" as used herein is denoted a multicomponent material comprising multiple different phase domains in which at least one type of phase domain is a continuous phase and in which at least one component is a polymer.

By the term "impregnation" as used herein is denoted the penetration of monomeric, oligomeric or polymeric liquids or mixtures thereof into an assembly of fibers.

By the term "prepreg" as used herein are denoted sheets of a substrate that have been impregnated with a curable prepolymer, or liquid reactants or a thermoplastic and are ready for the fabrication of laminates.

By the term "wetting" as used herein is denoted a process by which the interface between a solid and a gas is replaced by an interface between the same solid and a liquid.

By the term "high molecular weight" as used herein is denoted a weight average molecular weight Mw>50000 g/mol as measured by GPC.

By the term "aspect ratio" for a fiber as used herein is denoted the ratio between the length and the diameter of the fiber.

By the term "two dimensional structure" for a fibrous material as used herein is denoted that the fibers are not single, but touch each other in order to form at least a two dimensional structure for example in form of a nonwoven or a net or a fabric.

By the term "in-situ polymerization" as used herein is denoted that the final polymerization of the polymeric thermoplastic matrix of the composite material takes place around the fibrous reinforcement material in order to obtain directly the thermoplastic composite material.

Matrix Polymer

With regard to the thermoplastic (meth)acrylic matrix, one could mention thermoplastic polymers as poly alkyl methacrylates or poly alkyl acrylates. The alkyl group or the corresponding alkyl methacrylate or alkyl acrylate monomers consist of C1-C12 alkyl groups.

In a preferred embodiment the thermoplastic (meth)acrylic matrix is poly methyl methacrylate (PMMA).

The term "PMMA" denotes a methyl methacrylate (MMA) homopolymer or a copolymer comprising at least 70%, preferably at least 80%, advantageously at least 90% and more advantageously at least 95% by weight of methyl methacrylate or a mixture of at least one homopolymer and at least one copolymer of MMA, or a mixture of at least two homopolymers or two copolymers of MMA with a different average molecular weight or a mixture of at least two copolymer of MMA with a different monomer composition.

The copolymer of methyl methacrylate (MMA) comprises from 70% to 99.7% by weight of methyl methacrylate and from 0.3 to 30% by weight of at least one monomer having at least one ethylenic unsaturation that can copolymerize with methyl methacrylate. These monomers are well known and mention may be made, in particular, of styrene, alpha-methylstyrene, acrylic and methacrylic acids and alkyl (meth)acrylates in which the alkyl group has from 1 to 12 carbon atoms. As examples, mention may be made of methyl acrylate and ethyl, butyl or 2-ethylhexyl (meth)acrylate. Preferably the comonomer is an alkyl acrylate in which the alkyl group has from 1 to 4 carbon atoms.

In a preferred embodiment the copolymer of methyl methacrylate (MMA) comprises from 80% to 99.7% advantageously from 90% to 99.7% and more advantageously from 90% to 99.5% by weight of methyl methacrylate and from 0.3% to 20% advantageously from 0.3% to 10% and more advantageously from 0.5% to 10% by weight of at least one monomer having at least one ethylenic unsaturation that can copolymerize with methyl methacrylate. Preferably the comonomer is methyl acrylate or ethyl acrylate or mixtures thereof.

The weight average molecular weight of the thermoplastic (meth)acrylic matrix should be high, meaning larger than 50 000 g/mol, preferably larger than 100 000 g/mol.

The weight average molecular weight can be measured by size exclusion chromatography (SEC).

Fibrous Reinforcement

With regard to the reinforcement material, one can mention fibrous material. The fibrous material can have different forms and dimensions either one dimensional, two dimensional or three dimensional.

The one dimensional form is linear long fibers. The fibers may be discontinuous or continuous. The fibers may be arranged randomly or as a continuous filament parallel to each other. A fiber is defined by its aspect ratio, which is the ratio between length and diameter of the fiber. The fibers used in the present invention are long fibers or continuous fibers. The fibers have an aspect ratio of at least 1000, preferably at least 1500, more preferably at least 2000, advantageously at least 3000 and most advantageously at least 5000.

The two dimensional form are fibrous mats or non woven reinforcements or woven roving or bundles of fibers, which can also be braded.

The three dimensional form are for example stacked or folded fibrous mats or non woven reinforcements or bundles of fibers or mixtures thereof, an assembly of the two dimensional form in the third dimension.

The origins of the fibrous material can be a natural or a synthetic one. As natural material one can mention vegetable fibers, wood fibers, animal fibers or mineral fibers.

Natural fibers are for example sisal, jute, hemp, flax, cotton, coconut fibers, and banana fibers. Animal fibers are for example wool or hair.

As synthetic material one can mention polymeric fibers chosen from fibers of thermosetting polymers, from thermoplastic polymers or their mixtures.

The polymeric fibers can be made of polyamide (aliphatic or aromatic), polyester, polyvinylalcohol, polyolefins, polyurethanes, polyvinylchloride, polyethylene, unsaturated polyesters, epoxy resins and vinylesters.

The mineral fibers can also be chosen from glass fibers especially of type E, R or S2, carbon fibers, boron fibers or silica fibers.

The fibrous material of the present invention is chosen from vegetable fibers, wood fibers, animal fibers, mineral fibers, synthetic polymeric fibers, glass fibers, carbon fibers or mixtures thereof.

Additive

With regard to the polymeric, small molecule or inorganic additive, it may be present in the composite at levels of 0.005% to 50% by weight with respect to the thermoplastic matrix.

Polymeric additives of the invention include but are not limited to styrenic polymers, polyolefins, polylactic acid (PLA) polyethylene terephthalate (PET), polybutylene terephthalate (PBT), polyvinyl chloride (PVC), polycarbonate (PC), polyurethane (PU), polyamides, thermoplastic fluoropolymers, block copolymers, or mixtures thereof. Polymeric additives are preferably used between 0.5% and 50%, more preferably between 5% and 40% and most preferably between 10% and 30%. The polymeric additives my influence many properties and/or surface properties of the material; including but not limited to mechanical, density, thermal, surface hardness, scratch or mar resistance, electronic conductivity, dielectric properties, antistatic behaviour, flame resistance, flame spread resistance, light transmission, reflection or absorption, surface roughness, color, gloss and other aesthetic properties.

Styrenic polymers, as used herein, include but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenated derivatives, styrene-isoproene copolymers styrene-isoprene-styrene (SIS) block copolymers and their partially or fully hydrogenated derivatives, styrene-(meth)acrylate copolymers such as styrene-methyl methacrylate copolymers (S/MMA), and mixtures thereof. A preferred styrenic polymer is ASA.

Useful fluoropolymers for use in the invention, include, but are not limited to polyvinylidene fluoride (PVDF), ethylene tetrafluoroethylene (ETFE), terpolymers of ethylene with tetrafluoroethylene and hexafluoropropylene (EFEP), terpolymers of tetrafluoroethylene-hexafluoropropylene-vinyl fluoride (THV), copolymers of vinyl fluoride, and blends of PVDF with functionalized or unfunctionalized polymethyl methacrylate polymers and copolymers. The fluoropolymers may be functionalized or unfunctionalized, and could be homopolymers or copolymers—preferably copolymers with other fluorine monomers including vinyl fluoride; vinylidene fluoride (VDF); trifluoroethylene (VF3); chlorotrifluoroethylene (CTFE); 1,2-difluoroethylene; tetrafluoro ethylene (TFE); hexafluoropropylene (HFP); perfluoro(alkyl vinyl) ethers, such as perfluoro(methyl vinyl) ether (PMVE), perfluoro(ethyl vinyl) ether (PEVE) and perfluoro(propyl vinyl) ether (PPVE); perfluoro(1,3-dioxole); perfluoro(2,2-dimethyl-1,3-dioxole) (PDD), and blends thereof. Copolymers comprise at least 60% VDF monomer units, preferably at least 70% VDF monomer units.

In one particularly useful embodiment of the invention, the fluoropolymer is either a homopolymer of vinylidene fluoride or a copolymer of vinylidene fluoride and hexafluoropropylene.

Another particularly useful type of additives are impact modifiers. One can also consider impact modifier is in the form of fine particles having an elastomer core and at least one thermoplastic shell, the size of the particles being in general less than 1 micron and advantageously between 50 and 300 nm. The impact modifier is prepared by emulsion polymerization. One may also consider block copolymer impact modifiers. The impact modifier content in the polymeric thermoplastic matrix is between 1 and 50%, preferably between 5 and 25%, and advantageously between 10 and 20% by weight.

Another particularly useful type of polymeric additives are polymeric spherical particles with a particle size between 0.5 microns and 1,000 microns that can be used to modify the light absorbing or diffusing characteristics, may function as matting agents or may impart surface texture to the material. These spherical polymer additives are used between 1 and 20%, preferably between 2 and 10%.

Small molecule additives of the invention include but are not limited to UV absorbers (including benzatriazoles, triazines, cyanoacrylate and hindered amine light stabilizers), stabilizers, plasticizers, coloring agents, dyes, antioxidants, antistatic agents, surfactants, toner, refractive index matching additives, additives with specific light diffraction, light absorbing, or light reflection characteristics, dispersing aids, radiation stabilizers such as poly(ethylene glycol), poly(propylene glycol), butyl lactate, and carboxylic acids such as lactic acid, oxalic acid, and acetic acid, or additives with specific light diffraction, light absorbing, or light reflection characteristics. Small molecules additives are preferably used in the invention at 0.005% to 5%, more preferably at 0.01 to 3% and most preferably at 0.1 to 1%.

In one particularly useful aspect of the invention, one of the small molecule additive is a UV absorber of the chemical class of benzatriazoles. Tinuvin® P or Tinuvin® 360 are particularly preferred types of benzatriazole UV absorbers.

In another particularly useful aspect of the invention, the small molecule additive is a hindered amines light stabilizers. Tinuvin® 770 is particularly preferred types of hindered amine light stabilizer.

In another particularly useful aspect of the invention, the small molecule is an antioxidant, based on sulphur or phosphorous chemistry.

Useful inorganic additives of the invention include but are not limited to fillers (including but not limited to magnesium carbonate, calcium carbonate, hydrotalcite, dihydrotalcite, talc, dihydroxylated magnesium silicate, and antimony tartrate), mineral oxides (including but not limited to silica, alumina, zinc oxide, magnesium oxide, barium oxide, molybdenum disulfide, zinc oxide, titanium oxides, calcium oxide, antimony trioxide, boron nitride, tungsten disulfide and titanium oxide), clays/bentonites, nanomaterials such as nano mineral oxides, nano clays or nano-carbonaceous materials (including but not limited to nano-graphite, thermally reduced graphite oxide, graphite flakes, expanded graphite, graphite nano-platelets, graphene, single-walled carbon nanotubes, multi-walled carbon nanotubes), additives with specific light diffraction, light absorbing, or light reflection characteristics, light modification additives, such as inorganic spherical particles with a particle size between 0.5 microns and 1,000 microns and flame retardants (including but not limited to phosphorus-based additives such as phosphinates, diphosphinates, phosphonates, phosphates, red phosphorus, ammonium polyphosphates or hydrated mineral fillers such as metal hydroxides for example aluminum trihydrate (Al(OH)3) or magnesium hydroxide (Mg(OH)). The inorganic additive is preferably used at 0.1 to 50%, more preferably used at 1 to 30%. The inorganic additives my influence many properties and/or surface properties of the material; including but not limited to mechanical, density, thermal, surface hardness, scratch or mar resistance, electronic conductivity, dielectric properties, antistatic behaviour, flame resistance, flame spread resistance, light transmission, reflection or absorption, surface roughness, color, gloss and other aesthetic properties.

In one particularly useful aspect of the invention, the small molecule or inorganic additive is used as a colorant. Useful dyes and pigments of the invention include, but are not limited to: Cadmium zinc sulphide, CI Pigment Yellow 35, (CAS Reg. No. 8048-07-5, Reach No. 01-2119981639-18-0001), Cadmium sulphoselenide orange, CI Pigment Orange 20, (CAS Reg. No. 12656-57-4, Reach No. 01-2119981636-24-0001), Cadmium sulphoselenide red (CI Pigment Red 108, CAS Reg. No. 58339-34-7, Reach No. 01-2119981636-24-0001), Carbon Black (PBlk-7), TiO2 (PW-6), BaSO4 (PW-21 and PW-22), CaCO3 (PW-18), PbCO3, Pb(OH)2, (PW1), MACROLEX® Yellow 6G, MACROLEX® Yellow 3G, MACROLEX® Yellow G, MACROLEX® Yellow E2R, MACROLEX® Yellow RN, MACROLEX® Orange 3G, MACROLEX® OrangeR, MACROLEX® Red E2G, MACROLEX® Red A MACROLEX® Red EG, MACROLEX® Red G, MACROLEX® Red H, MACROLEX® RedB, MACROLEX® Red 5B, MACROLEX® Red Violet, MACROLEX® Violet 3R, MACROLEX® Violet B, MACROLEX® Violet 3B, MACROLEX® Blue 3R, MACROLEX® Blue RR, MACROLEX® Blue 2B, MACROLEX® Green 5B, MACROLEX® Green G, MACROLEX® FluorescentYel., and MACROLEX®. The colorant is preferably used at 0.1 to 10%, more preferably used at 0.5 to 8%.

The invention also contemplates the ability to achieve a non-homogeneous distribution of the additive in the composite. This non homogeneous distribution would mean that at least 1% by volume of the composite contains at least 1% by weight more or 1% by weight less of one of the additives as compared to the concentration of the same additive by weight in the remainder of the composite. As an example, if a composite article is 100 mm thick and the top 1 mm layer of the article contains 3 weight percent of the pigment, while the remaining 99 mm layer contains either less than 2.97 weight percent or greater than 3.03 weight percent of the pigment, this would constitute a non-homogeneous distribution of the pigment additive, i.e. 1% of 3% is 0.03%.

To assess the distribution of a non-miscible additive in the final composite part, one could consider cross sectional microscopy (such as atomic force microscopy or scanning electron microscopy) where representative cross-sectional images of both sections of the article are taken and utilizing an image analysis software, a volume percentage of the additive is calculated in both regions. Those skilled in the art could then utilize the relative densities of the matrix and additive to translate the volume percent to a weight percent. For either miscible or immiscible additives, one could consider separation and/or chemical analysis techniques, including but not limited to NMR, GC, LC, IR or pyrolysis GC, which could provide weight percent of the additives.

One particular process to achieve this non homogeneous distribution is by directly introducing the additive onto selective fibrous support layers or sections of the layer—but other processes to achieve this non homogeneous distribution are contemplated as well-including but not limited to the use of additives that preferentially migrate to surfaces or interfaces, or the use of additives that migrate due to application of heat, pressure or electromagnetic fields during cure.

Process

The polymeric composite according to the invention comprises a fibrous material, a polymeric thermoplastic (meth)acrylic matrix, polymeric, small molecule or inorganic additive. In one process considered by the invention, the additive is dissolved or dispersed into the liquid resin before polymerization. This can be done by any means known in the art, including the use of shear mixing via an overhead mixer with the liquid resin optionally heated to increase the speed of dispersion or dissolution. Another particularly useful method of incorporating the additive is to first make a higher concentration masterbatch of the additive in a monomer such as MMA. This masterbatch can then be added to the liquid syrup which comprises the monomers for forming the polymeric thermoplastic (meth)acrylic at appropriate level to achieve the desired target additive levels. The fiber and liquid resin are then brought into contact by a wetting step of the fibrous material with a liquid syrup comprising the monomers for forming the polymeric thermoplastic (meth)acrylic and the dissolved or dispersed additive. Polymerization of the monomers is then carried out.

In a second process considered by the invention, the additive material is introduced directly onto the fibrous material followed by a wetting step of the fibrous material with a liquid syrup comprising the monomer or the monomers for forming the polymeric thermoplastic (meth)acrylic and the additive before the polymerization step. The introduction of the additive directly onto the fibrous material can be done by any means known in the art, including but not limited to liquid coating steps—where the additive is either a liquid or is dissolved or dispersed in a liquid solvent—or powder coating. For a liquid coating process, the liquid could be introduced to the fiber by any means known to the art such as spray or dip coating- and if necessary excess solvent (for the case of an additives dissolved or dispersed in the liquid) could be evaporated off. For a powder coating, the additive could be applied on one or both sides during or after fiber production. For either liquid or powder coatings, the fiber may be treated with a binder prior to depositing the additive to improve adhesion of the additive to fiber.

After additive introduction, the fiber and liquid resin are then brought into contact by a wetting step of the fibrous material with a liquid syrup comprising the monomers for forming the polymeric thermoplastic (meth)acrylic. Polymerization of the monomers is then carried out. This process has the advantage that a non-homogeneous distribution of the additive may be achieved. This may especially be advantageous in situations when improvements to surface properties including but not limited to UV stability, chemical resistance, scratch resistance, mar resistance, color, gloss, electronic conductivity, antistatic properties or flame spread resistance are desired. In these situations, for property improvements to be realized, it may only be necessary to introduce additives very close to the surface of the part—which may be achieved using this process by introducing the additive onto only the top ply or top few plies of the composites. If instead, the material is introduced into the resin, a more homogeneous distribution of the additive will likely be anticipated. The homogenous distribution may be detrimental as other bulk mechanical properties may be deteriorated by the additive. The homogenous distribution may also incur an economic penalty—especially for more expensive additives—as a higher total amount of additive is needed if it distributed evenly in the entire part.

A third method considered by the invention is to introduce the additive is via the introduction of a porous into the composite laminate structure. The film may be composed 100% of the additive or the additive could be dispersed in a polymeric carrier matrix, preferably a film matrix that is compatible with the acrylic resin matrix of the composite. This method again has the advantage of non-homogeneous distribution of the additive. Similarly a non-porous film containing the additive could be introduced on one side of the laminate structure In a fourth method considered by the invention dispersion of the additives are carried out in two different liquid resin matrices comprising of differing levels (where the level in one matrix could be 0%) or types of additives. For instance, a non-porous barrier film may be introduced into a middle layer of the composite structure. Two different infusions or injections of resin could be performed into each region of the composites (divided by the barrier film) with resins containing differing amounts or types of additives—allowing for non-homogeneous distribution. In an alternative method considered by the invention, surface RTM can be utilized. A mold may be completely filled with a first resin with a given level and type of additive. After polymerization, the mold could be opened slightly followed by filling with a second resin with a given level and type of additive, again alloying for non-homogeneous dispersion.

With regard to the polymerization method for obtaining the thermoplastic (meth)acrylic matrix, one can mention radical, anionic polymerization or photopolymerization.

With regard to the radical initiator, they can be chosen from diacyl peroxides, peroxy esters, dialkyl peroxides, peroxyacetals or azo compounds. The radical initiators which may be suitable are, for example, isopropyl carbonate, benzoyl peroxide, lauroyl peroxide, caproyl peroxide, dicumyl peroxide, tert-butyl perbenzoate, tert-butyl per(2-ethylhexanoate), cumyl hydroperoxide, 1,1-di(tert-butylperoxy)-3,3,5-trimethyl-cyclohexane, tert-butyl peroxyisobutyrate, tert-butyl peracetate, tert-butyl perpivalate, amyl perpivalate, tert-butyl peroctoate, azobisisobutyronitrile (AIBN), azobisiso-butyramide, 2,2'-azobis(2,4-dimethylvaleronitrile) or 4,4'-azobis(4-cyanopentanoic). It would not be departing from the scope of the invention to use a mixture of radical initiators chosen from the above list. The preferred radical initiator is azobisisobutyronitrile.

The content of radical initiator with respect to the monomers of the mixture which is cast in the mould varies from 100 to 2000 ppm (by weight), preferably between 200 and 1000 ppm, by weight.

Another ingredient can also be a chain-limiting agent in order to control the molecular weight, for example γ-terpinene or terpinolene, at contents of between 0 and 2500 ppm and preferably between 0 and 1500 ppm, with respect to the monomers of the mixture.

If the viscosity of the liquid prepolymer or syrup at a given temperature is too high for the correct impregnation, it is possible to heat the syrup in order to have a more liquid syrup within the before mentioned dynamic viscosity interval at the respective temperature during which the impregnation takes place for the sufficient wetting and correct and complete impregnation of the fibrous material.

With regard to the structure or composition of the polymeric composite material of the present invention, it comprises at least 20% by weight of fibrous material, preferable at least 40% by weight of fibrous material advantageously at least 50% by weight of fibrous material and advantageously at least 55% by weight of fibrous material based on the total composition.

The polymeric composite material of the present invention, it comprises at most 99% by weight of fibrous material, preferable at most 95% by weight of fibrous material advantageously at most 90% by weight of fibrous material and advantageously at most 80% by weight of fibrous material based on the total composition.

The structure of the composite concerns also laminates. Several layers or sheets of the thermoplastic fibrous composite material may be bonded together by lamination.

With regard to the method of preparation of the polymeric composite material, several methods could be used in order to prepare three dimensional samples. One can mention lamination, pultrusion, infusion, vacuum bag moulding, pressure bag molding, autoclave molding, resin transfer moulding (RTM), reinforced reaction injection molding (R-RIM) and variants thereof, press molding, filament winding, compression molding or wet lay up.

All methods comprise the steps of wetting the fibrous material with the liquid syrup comprising the monomers for forming the polymeric thermoplastic (meth)acrylic matrix before the polymerization step. As mentioned above the additive is either dissolved or dispersed into the polymer matrix or is introduced directly onto the fibrous material.

The final molecular weight of the thermoplastic polymeric matrix is obtained during one of the mentioned methods for the preparation of the polymeric composite material.

In the pultrusion method a long continuous product of constant cross section is produced. The fibers coming from creels are wetted and impregnated with the liquid resin in a resin bath followed by preforming, shaping and polymerization.

Resin transfer molding is a method using a two sided mold set which forms both surfaces of composite material. The lower side is a rigid mould. The upper side can be a rigid or flexible mould. Flexible moulds can be made from composite materials, silicone or extruded polymer films such as nylon. The two sides fit together to produce a mould cavity. The distinguishing feature of resin transfer moulding is that the reinforcement materials are placed into this cavity and the mould set is closed prior to the introduction of matrix material. Resin transfer moulding includes numerous varieties which differ in the mechanics of how the resin is introduced to the reinforcement in the mould cavity. These variations include everything from vacuum infusion to vacuum assisted resin transfer moulding (VARTM). This process can be performed at either ambient or elevated temperature. Ambient temperature means between 10° C. and 50° C. Elevated temperature means up to 200° C. Preferably elevated temperature is from 50° C. up to 160° C.

With the infusion method the liquid prepolymer syrup does have to have a viscosity adapted towards the preparation method of the polymeric composite material. The syrup is aspired into the fibrous material present in a special mold by application of a slight vacuum. The fibrous material is infused and completely wetted by the liquid prepolymer syrup.

One advantage of this method is the high amount of fibrous material in the composite.

The preferred methods for preparing the composite materials are methods were the liquid resin of the not yet polymerized matrix material is transferred to the fibrous material more preferably in a mold.

Advantageously the wetting step of the fibrous material is made in a closed mold, by resin transfer molding or by infusion.

More advantageously the wetting step of the fibrous material and the preparation of the thermoplastic composite material take place in the same mold, which is a closed mold.

The mold is opaque towards visible and ultraviolet radiation at least on one side.

A closed mold will amongst other things avoid and reduce the evaporation of the monomer and protect the environment.

Still another aspect of the present invention is a manufacturing process for manufacturing mechanical or structured parts or articles comprising the thermoplastic composite material according to the invention comprising following steps:

a) impregnating a fibrous substrate with a liquid syrup,
b) polymerising the liquid syrup impregnating said fibrous substrate.

Preferably the impregnation of the fibrous substrate in step a) is made in a closed mold.

Advantageously the step a) and step b) are made in the same closed mould. The mold is opaque towards visible and ultraviolet radiation at least on one side of the mold.

Using the same closed mold will avoid the transfer of the material after impregnation and polymerizing in a closed mold will guarantee a good distribution of the heat, having a satisfying yield of polymerization and eventually evaporation of the monomer(s).

With regard to the use of polymeric composite material, one can mention automotive applications, nautical applications, railroad applications, sport, aeronautic and aerospace applications, photovoltaic applications and wind energy applications.

The polymeric composite material according to the invention is used to manufacture mechanical or structured parts or articles particularly three-dimensional mechanical or structured parts.

Due to the complete, correct and in a homogenous wetting of the fibrous substrate during impregnation there are no defects of fiber wetting for example by bubbles and voids decrease the mechanical performance of the composite material.

The manufactured mechanical or structured parts or articles comprising polymeric composite material according to the invention do not comprise essentially any pores. By pore is meant a spherical void with a diameter of at least 1 μm or larger or an elongated ellipsoidal void in form of an oblate with a smallest principal axe of at least 0.5 μm or larger. By "comprising essentially no pores" is meant that the pores represent less then 1 vol %, preferably less then 0.5 vol % and more preferably less than 0.2 vol % of the total volume of the thermoplastic composite material With regard to the use of manufactured mechanical or structured parts or articles, one can mention automotive applications, nautical applications, railroad applications, sport, aeronautic and aerospace applications, photovoltaic applications, computer related applications, telecommunication applications and wind energy applications.

Particularly the three-dimensional mechanical or structured part is a automobile part, boat part, train part, sport article, plane or helicopter part, space ship or rocket part, photovoltaic module part, wind turbine part, furniture part, construction or building part, telephone or cell phone part, computer or television part, printer and photocopy part.

With regard to the recycling of the thermoplastic composite material or manufactured mechanical or structured part or article comprising the thermoplastic composite material it can be made by grinding or depolymerization of the thermoplastic polymer.

Grinding is made mechanically in order to obtain smaller parts of pieces. As the structured part compromises thermoplastic polymer, this polymer can be heated, and the pieces again transformed in a certain limit in order to obtain a recycled object.

Preferably the structured part comprising the thermoplastic composite is heated for making a pyrolysis or thermal decomposition of the PMMA and recovering the methyl methacrylate (MMA) as monomer.

Advantageously at least 50 wt % of the MMA present in the polymer are recovered by thermal decomposition.

The structured part is heated at a temperature of at least 200° C. and no more than 400° C.

Grinding is made mechanically in order to obtain smaller parts of pieces. As the structured part compromises thermoplastic polymer, this polymer can be heated, and the pieces again transformed in a certain limit in order to obtain a recycled object.

With regard to the post-processing of the thermoplastic composite material or manufactured mechanical or structured part or article comprising the thermoplastic composite material one can consider processes such as thermoforming or melt blending of the article to achieve a new shape after the initial processing. One can also consider mechanisms to adhere the composite article a $2^{nd}$ material—whether it be polymeric, metallic, ceramic, composite or made from another material of construction. Adhesives may be applied to join the material. Another particularly useful way of joining similar or dissimilar composite or thermoplastic materials that one can mention is welding. Welding may be used to join the composite material and article of the invention to a $2^{nd}$ material.

Test Methods

The weight fraction of the fibres in the composite material is obtained by the norm NF EN 2564 ("Serie aerospatiale—Stratifies de fibres de carbone Determination de la teneur en fibres en resine et du taux de porosite")

The mechanical properties in traction are characterized by following the norm ISO 527-4 ("Plastics—Determination of tensile properties—Part 4: Test conditions for isotropic and orthotropic fibre-reinforced plastic composites") type 3.

The mechanical properties in compression are characterized by following the norm ISO 14126:1999 ("Fibre-reinforced plastic composites—Determination of compressive properties in the in-plane direction") type A1 following a set up of Celanese type.

The mechanical properties in of 3 points bending are characterized by following the norm NF EN 2562 ("Carbon fibre reinforced plastics. Unidirectional laminates. Flexural test parallel to the fibre direction") type 1.

EXAMPLES

Example 1: Effect of UV Absorbers

In order to improve the UV stability of a composite material with a polymeric thermoplastic (meth)acrylic matrix, two types of UV absorbers were incorporated into the liquid resin before initiators were added. This was accomplished by first creating a concentrate of said UV absorbers in MMA via shear stirring. This concentrate was added to the liquid composite resin, which comprises 20 wt % of PMMA with an MFI of 1.5 g/10 min (according to ASTM D1238 measured at 230° C./3.8 kg) dissolved in 80% of MMA, at levels appropriate to achieve target formulation. The liquid syrup was then combined with glass fibers via vacuum infusion where a benzoyl peroxide initiator (3% Luperox® AFR 40) was used to cure the syrup at room temperature.

Tinuvin® P and Tinuvin® 360 were the two benzatriazole UV absorbers used. Resin formulations containing Tinuvin® P at 150 ppm and 700 ppm were used. A comparative example with no UV absorber was also fabricated and tested.

After exposing the samples based on SAE-J2527 Xenon Arc accelerated weathering protocol for 3800 hrs (5000 kJ/m2) the samples were evaluated based on yellowness index (YI) and Delta-b (yellow-blue color space). Results of the study are presented in Table 1

TABLE 1

| Resin system | UV absorber | Level (ppm) | YI | Delta-b |
|---|---|---|---|---|
| Elium ®150 + 3% Luperox ® AFR40 | n/a | n/a | 35.11 | 15.04 |
| Elium ®150 + 3% Luperox ® AFR40 | Tinuvin ® P | 150 | 30.84 | 12.78 |
| Elium ®150 + 3% Luperox ® AFR40 | Tinuvin ® P | 700 | 12.78 | 5.75 |
| Elium ®150 + 3% Luperox ® AFR40 | Tinuvin ® 360 | 1025 | 6.43 | 3.45 |

As can be readily observed the incorporation of the UV absorber additive greatly improves the UV stability of the material—leading to lower levels of YI and smaller Delta-b values, both indicating less yellowness in the part after UV exposure—critical for outdoor aesthetic applications.

Example 2: Effect of Colorants

The effects of pigments on ELIUM® C195, was evaluated to measure the evolution of viscosity according to pigment color.

Samples:
1. ELIUM® C195, (20 wt % PMMA dissolved in 80 wt % MMA monomer)
2. ELIUM® C195 with Black pigment
3. ELIUM® C195 with White pigment
4. ELIUM® C195 with Blue pigment
5. ELIUM® C195 with Red pigment
6. ELIUM® C195 with Silver pigment Experimental:

In an 8 oz glass jar, the appropriate amount of pigment (4 g or 1 g) was weighed using a pipette, and the respective quantity of ELIUM® C195 resin (93 g or 96 g) was added and the jar was capped. The material was stabilized at room temperature for at least 1 hour.

Then 3% (3 g) of Luperox® A75 initiator was added. The material was stirred for 5 minutes using a tongue depressor and a stopwatch was started as soon as the mixing begun. After approximately 30 seconds a thermocouple wire was placed into the solution and secured in place. Then the temperature and viscosity recorders were started and at which time a note was made of the starting temperature. The material was monitored visually as well as periodic readings of temperature and viscosity being recorded. Notes were taken when the peak temperature was achieved.

The viscosity was recorded by a viscometer Brookfield DVII+ Pro, which can record viscosity from only 0 cP to 2000 cP.

The following formulations were prepared, and the reactions were carried out at room temperature, 22° C.

TABLE 2

| Samples | Formulations |
|---|---|
| 1: Unpigmented ELIUM ® C195 | 97% Elium C195 + 3% Luperox A75 |
| 2: Black pigmented ELIUM ® C195 | 93% Elium C195 + 4% black + 3% Luperox A75 |
| 3. White pigmented ELIUM ® C195 | 93% Elium C195 + 4% white + 3% Luperox A75 |
| 4. Blue pigmented ELIUM ® C195 | 93% Elium C195 + 4% blue + 3% Luperox A75 |
| 5. Red pigmented ELIUM ® C195 | 93% Elium C195 + 4% red + 3% Luperox A75 |
| 6. Silver pigmented ELIUM ® C195 | 96% Elium C195 + 1% silver + 3% Luperox A75 |

Results

The viscosity was recorded on day 1, 2, 3 and 7. The viscosity of blue pigmented ELIUM® C195 was over 2000 cP on day 2, which is the limit of the viscometer. The viscosity of black pigmented resin was over 2000 cP on day 7.

Summary of viscosity over time with comments and aspect observations presented in Table 3 and FIG. 1

TABLE 3

| Sample/color | Viscosity (cP) | | | |
|---|---|---|---|---|
| | Day 1 | Day 2 | Day 3 | Day 4 |
| 2. Black | 196 | 585 | 1900 | >2000, gel |
| 3. White | 150 | 150 | 144 | 400 still liquid |
| 4. Blue | 180 | >2000 | >2000 start to react, impossible to put spindle in | >2000 gel |
| 5. Red | 200 | 170 | 500 | 800, liquid, a bit viscous |
| 6. Silver | 130 | 140 | 160 | 300, still liquid |

Blue pigmented ELIUM® C195 gelled first; day 3. Black pigmented ELIUM® C195 also became viscous quickly measuring over 2000 cP on day 7. Red pigmented ELIUM® C195 became viscous on day 7 but remains still liquid. White and Silver pigmented ELIUM® C195 viscosities' increased on day 7, but the materials remain totally liquid.

Example 3 Infusion of Pigmented ELIUM® Liquid Resin

Pigmented RT150 Solution Formulation:
95% ELIUM® RT150 (20% P MMA dissolved in 80% MMA)
5% Green pigment (25% phthalocyanine green/75% cellulose acetate butyrate)

Mixing Method:
Added 285 g of ELIUM® RT150 to 1000 m in a HDPE beaker
Added 15 g of green "crumb" pigment
Pigment coagulated
Beaker was covered with aluminum foil to prevent MMA evaporation out of RT150
Stirred with shear mixing head at 200 RPM for 1+ hours. Clumps of coagulated pigment still remained at the bottom of the beaker. Removed the clumps and reweighed resin—260 g. Added 7.8 g of or 3% Luperox® EZFlo and mixed with wooden stick until dissolved (~30 seconds)

Pre-Prepared a 12"×10" Laminate for Infusion on a Level Glass Mold Surface:
  8 plies of plain weave Chomorat glass fiber mat
  Peel ply on top of the mat
  1405-B; LDPE Infusion Flow Media, Red
  Stretchlon 800 PE bag
  Grey vacuum tape
Infusion of Laminate Panel:
  Set vacuum regulator to 300 Torr
  19 minutes for complete wet out of fiber, This was longer than the 3 minute norm—likely related to the layup configuration. There was about ¼" gap between flow media under the inlet and the glass panel. This gap was connected via peel ply, which is much less porous than flow media
  Clamped off inlet and maintained constant vacuum
  Resin bucket temperature:
    38 min=28° C.
    48 min=51° C.
    1 hour=91° C. (still not completely initiated)
    1 hour 5 min=fully initiated
  Demolded cured panel 90 minutes after initiation
Panel Description
  9 out of 10 for wet out appearance
  Quite a bit of porosity last 3 inches before outlet
  Panel was darker on B side where Flow media was places and also held more resin
  B side has signs of air entrapment or formation within flow media
  Very nice Green color!
Conclusions/Findings:
  Pigment allows operator to view the wet out process much more readily
  Flow of resin at the end of fill was inconsistent and entrapped air causing porosity.

Example 4: Non-Acrylic Polymer Additives

A sample of ELIUM® 150 (20% PMMA dissolved in 80% MMA) was compared to a sample of the same ELIUM® 150 in which the 20% PMMA was replaced with 20% of an ABS resin. The viscosity of the ELIUM® liquid resin mixture was 141 cPs. The viscosity of the ABS based ELIUM® liquid resin mixture was 227 cPs The mixtures were initiated and formed into a cast sheet. Notched, un-notched and sharp notched charpy measurements were taken, with the following results:
Unnotched charpy values: ELIUM® 150: 19.24 kJ/m^2;
  ABS-based ELIUM®: 48.7 kJ/m^2;
Notched charpy values: ELIUM® 150=1,57 kJ/m^2;
  ABS-based ELIUM®=4.89 kJ/m^2;
Sharp Notched Charpy test (Mc values): ELIUM® 150=1.09 kJ/m^2;
  ABS-based ELIUM®=3.66 kJ/m^2;

The invention claimed is:

1. A composite material comprising:
  (a) a polymeric thermoplastic (meth)acrylic matrix,
  (b) 20-99% by weight a fibrous material as reinforcement based on the total weight of the composite material, and
  (c) 0.5-50% by weight of one or more non-acrylic polymer additives based on the weight of the polymeric thermoplastic (meth)acrylic matrix,
  wherein the fibrous material has either at least an aspect ratio of the fibre of at least 1000 or at least a two dimensional macroscopic structure, and
  wherein said one or more non-acrylic polymer additives is selected from the group consisting of a homopolymer of vinylidene fluoride, a copolymer of vinylidene fluoride and hexafluoropropylene, or mixtures thereof.

2. The composite material according to claim 1, wherein the polymeric thermoplastic (meth)acrylic matrix is chosen from a homo- or copolymer of methyl methacrylate or mixtures thereof.

3. The composite material according to claim 2, wherein the polymeric thermoplastic (meth)acrylic matrix is chosen from methyl methacrylate (MMA) homopolymer or a copolymer comprising at least 70% by weight of methyl methacrylate.

4. The composite material according to claim 2, wherein the polymeric thermoplastic (meth)acrylic matrix is chosen from a mixture of at least one homopolymer and at least one copolymer of MMA, or a mixture of at least two homopolymers or two copolymers of MMA with a different weight average molecular weight or a mixture of at least two copolymers of MMA with a different monomer composition.

5. The composite material according to claim 1, wherein the fibrous material is chosen from vegetable fibers, wood fibers, animal fibers, mineral fibers, synthetic polymeric fibers, glass fibers, carbon fibers or mixtures thereof.

6. Process for preparing a polymeric composite material comprising:
  (a) a polymeric thermoplastic (meth)acrylic matrix,
  (b) 20-99% by weight a fibrous material as reinforcement based on the total weight of the composite material, wherein the fibrous material has either at least an aspect ratio of the fibre of at least 1000 or at least a two dimensional macroscopic structure, and
  (c) 0.005-5% by weight of one or more additives configured to improve the UV or thermal stability of the composite material,
  the process comprising:
    dissolving or dispersing the one or more additives into liquid resins, wherein at least two different liquid resins are prepared, wherein said difference in the liquid resins is either different levels and/or different types of additive(s),
    wetting the fibrous material with a liquid syrup comprising a monomer or monomers for forming the polymeric thermoplastic (meth)acrylic and the one or more additives before a polymerization step, wherein wetting comprises separate injections or infusions of each different liquid resin, and wherein a barrier film is introduced into the composite material to allow for regions of different concentrations or types of additives with the two separate injections or infusions.

7. Process for preparing a polymeric composite material according to claim 6, utilizing surface resin transfer molding (RTM), wherein a first injection fills the mold with a resin of a given additive concentration or type, then the mold is opened wider allowing for a second injection with a different additive concentration or type.

8. Process for preparing a polymeric composite material according to claim 6 comprising introducing the additive material directly onto the fibrous material, followed by a wetting step of the fibrous material with a liquid syrup comprising the monomer or the monomers for forming the polymeric thermoplastic (meth)acrylic before the polymerization step.

9. Process for preparing a polymeric composite material according to claim 6, comprising introducing the additive material in a film form or via the use of a carrier film into the composite material, followed by a wetting step of the fibrous material and film with a liquid syrup comprising the monomer or the monomers for forming the polymeric thermoplastic (meth)acrylic before the polymerization step.

10. Process for preparing the polymeric composite material according to claim 6, wherein the wetting step of the fibrous material is made in a closed mold.

11. Process for preparing the polymeric composite material according to claim 6, wherein the wetting step of the fibrous material is made in a closed mold, by resin transfer molding or by infusion.

12. Process for preparing the polymeric composite material according to claim 6, wherein the wetting step of the fibrous material occurs by pultrusion.

13. A manufactured mechanical or structural part or article comprising the composite material according to claim 1.

14. The manufactured mechanical or structured part or article according to claim 13, wherein said part or article contains essentially no pores.

15. The manufactured mechanical or structured part or article of claim 13, wherein said part or article comprises part of an automotive, marine, railroad, sport, aeronautic, aerospace, photovoltaic, or wind energy structure.

16. The manufactured mechanical or structured parts or article according to claim 13, wherein said part or article is selected from the group consisting of and automobile part, boat part, train part, sport article, plane or helicopter part, space ship or rocket part, photovoltaic module part, wind turbine part, furniture part, construction or building part, telephone or cell phone part, computer or television part, printer and photocopy part.

\* \* \* \* \*